(12) United States Patent
Grell

(10) Patent No.: US 7,017,400 B2
(45) Date of Patent: Mar. 28, 2006

(54) VEHICLE MAINTENANCE IDENTIFICATION APPARATUS

(76) Inventor: Mathew L. Grell, 4307 Jones Bridge Cir., Norcross, GA (US) 30092

( * ) Notice: Subject to any disclaimer, the term of this patent is extended or adjusted under 35 U.S.C. 154(b) by 40 days.

(21) Appl. No.: 10/811,117

(22) Filed: Mar. 26, 2004

(65) Prior Publication Data

US 2005/0210968 A1    Sep. 29, 2005

(51) Int. Cl.
*G01M 15/00* (2006.01)

(52) U.S. Cl. .......... 73/116; 73/49.7; 116/28 R; 180/69.1; 184/106; 206/557; 220/573; 296/38

(58) Field of Classification Search .......... 73/116, 73/117.2, 117.3, 118.1, 119 R, 40, 46, 49.7, 73/49.8; 15/215; 116/28 R; 180/69.1; 184/106; 206/557; 220/573; 296/38
See application file for complete search history.

(56) References Cited

U.S. PATENT DOCUMENTS

| | | | |
|---|---|---|---|
| 3,141,522 A | | 7/1964 | Fitzpatrick |
| 3,590,937 A | * | 7/1971 | Andrews .......... 180/69.1 |
| 4,074,948 A | * | 2/1978 | Heater, Jr. .......... 404/75 |
| 4,246,982 A | * | 1/1981 | Pretnick .......... 184/106 |
| 4,497,147 A | * | 2/1985 | Clapper et al. .......... 52/105 |
| 4,564,546 A | | 1/1986 | Jones |
| 4,798,754 A | | 1/1989 | Tomek |
| 4,801,005 A | * | 1/1989 | Hahn et al. .......... 141/98 |
| 5,011,007 A | * | 4/1991 | Kenimer .......... 206/205 |
| 5,020,638 A | * | 6/1991 | Smith .......... 184/106 |
| 5,128,189 A | | 7/1992 | Bartlett |
| 5,478,625 A | * | 12/1995 | Wright .......... 428/119 |
| 5,549,178 A | * | 8/1996 | Yuhas .......... 184/106 |
| 5,549,945 A | * | 8/1996 | Lind .......... 428/35.5 |
| 5,916,658 A | * | 6/1999 | Mohr .......... 428/81 |
| 5,957,241 A | | 9/1999 | Anderson |
| 6,062,162 A | * | 5/2000 | Dean .......... 116/28 R |
| 6,439,492 B1 | * | 8/2002 | Leiggi .......... 242/379 |
| 2002/0108956 A1 | | 8/2002 | Doh |
| 2003/0141150 A1 | * | 7/2003 | Bemis .......... 184/106 |

* cited by examiner

*Primary Examiner*—Eric S. McCall
(74) *Attorney, Agent, or Firm*—Mathew L. Grell

(57) ABSTRACT

The invention described and claimed in this application is for a fluid drip, tire tread, tire pressure, and foreign exhaust identification apparatus for a vehicle and the like. The inventive device includes a mat with stenciled regions drawn on the mat that identify various vehicle systems, which is placed beneath a vehicle, whereby each region defines a receiving area for identifying fluid drips, particulate, or excessive emissions from a vehicle system and a tire platform comprised of a deformable material for measuring the tire pressure and tread depth.

33 Claims, 6 Drawing Sheets

VEHICLE MAINTENANCE IDENTIFICATION APPARATUS

CROSS REFERENCE TO RELATED APPLICATIONS

Not applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

The invention relates to vehicle maintenance identification apparatus, and more particularly pertains to a vehicle fluid drip mat for receiving and identifying the fluids drippings from a vehicle, the conditions of the tire tread, tire pressure and the identification of any foreign particulates or excessive emissions found in the exhaust.

2. Description of Prior Art

Oil absorbent mats have been designed for placement beneath a motor vehicle in order to absorb oil drippings. The most basic of these designs has been the drip pan which is simply a shallow pan placed beneath the vehicle to collect the dripping oil. These pans however must be periodically emptied and cleaned, an unpleasant and sometimes difficult task relating to internal combustion engines. A modification to this basic drip pan design has been the addition of an oil-absorbing layer to the drip pan or an oil-absorbing mat by itself, which absorbs the dripping oil. The oil-absorbing mat is typically made of a cellulois material. As shown in U.S. Pat. Nos. 3,141,522 and 5,957,241, these devices may include a frame, which partially contains the oil within the oil-absorbing mat.

In these respects, the vehicle maintenance identification apparatus according to the present invention departs from the conventional concepts and designs of the prior art, and in so doing provides an apparatus primarily developed for the purpose of identifying vehicle fluid drippings, tire tread depth, tire pressure, foreign particulate or excessive emissions from motor vehicles and the like.

BRIEF SUMMARY OF THE INVENTION

This invention provides for a vehicle maintenance identification apparatus, and more particularly pertains to a vehicle fluid drip mat for identifying the drippings from a vehicle, the conditions of the tire tread, tire pressure and the identification of any foreign particulates or excessive emissions found in the exhaust and the like.

Vehicles having internal combustion engines typically have problems relating to the leakage of fluids or exuded material such as motor oil, power steering fluid, transmission oil, differential fluid, brake fluid, constant velocity (CV) joint, steering and suspension joints, battery fluids, radiator fluids, grease and the like. These fluids often drip on the floor below the vehicle. These drippings can be very messy, cause a dangerous condition to persons walking across the floor, an aesthetically unpleasant appearance on the floor and a potential harm to the floor itself.

The general purpose of the present invention, which will be described subsequently in greater detail, is to provide an apparatus for use by an operator, owner, mechanic, or other service personnel, a party interested in purchasing a used vehicle, vehicle inspection agencies and the like to attain the current or evolving status of a vehicle's immediate or upcoming maintenance and/or repairs based on the fluid drippings collected and identified, tire tread depth indicated, tire pressure indicated and/or the foreign particulate excessive emissions identified from the vehicle.

To attain this, the present invention generally comprises a planar bottom mat configured for placement beneath a vehicle with said mat having stenciled regions drawn on the mat defining a collecting area for receiving and identifying material such as fluid drips, particulate, or excessive emissions from a specific vehicle system, and a tire platform comprised of a deformable material for measuring the tire tread depth and tire pressure.

It is an object of this invention to provide a planar surface or mat defining a receiving area for identifying vehicle fluid drips.

It is another object of this invention to identify vehicle fluid drips based on its proximity to a vehicle system which is dripping the fluid, including motor oil, power steering fluid, transmission oil, differential fluid, brake fluid, constant velocity (CV) joint, steering and suspension joints, battery fluids and/or radiator fluid and the like. The term fluid or material includes the above fluid as well as liquids and/or semi-solids such as grease.

It is another object of this invention to identify vehicle fluid drips based on the color or texture the fluid, including motor oil, power steering fluid, transmission oil, differential fluid, brake fluid, constant velocity (CV) joint, steering and suspension joints, battery fluids and/or radiator fluid and the like.

It is another object of this invention to provide a tire bumper for each front wheel to stop the vehicle in a predetermined position in relation to the mat.

It is another object of this invention to provide various mats with stenciled regions drawn to accommodate vehicles with two-wheel drive, rear wheel drive, and four-wheel drive.

It is another object of this invention to provide various mats with stenciled regions drawn to accommodate semi tractor-trailer rigs.

It is another object of this invention to provide various mats with stenciled regions drawn to accommodate construction, agriculture, lawn and garden, and recreational equipment.

It is another object of this invention to provide a cover or other outermost layer to protect the mat and surface from the elements if the invention is used out doors.

It is another object of this invention to provide a mat comprised of a material that is impervious or absorbent.

It is another object of this invention to impregnate or coat the mat with reactive agents that will assist in the identification of a vehicle fluid or particulate.

It is another object of this invention to provide an apparatus to perform an analysis of the condition of a vehicle prior to purchasing said vehicle.

It is another object of this invention to assist an operator, owner, mechanic, or other service personnel in monitoring the condition of their vehicles.

It is another object of this invention to provide a tire bumper to assist the operator in parking the vehicle in the same position over the mat.

It is another object of this invention to provide a deformable planar surface area for each wheel to sit, which compresses according to the tire tread depth.

It is another object of this invention to identify vehicle tire tread depth to determine whether to rotate the tires, to determine the remaining life expectancy of the tires, or whether or not it is time to replace the tires.

It is another object of this invention to identify whether the tire is properly inflated.

It is another object of this invention to provide a planar surface or mat defining a collecting area for capturing exhaust emissions.

It is another object of this invention to identify foreign particulates or excessive emissions from the vehicle exhaust including oil, antifreeze/coolant or excessive pollutants.

According to one aspect of the present invention a vehicle maintenance apparatus is provided that has a mat configured for placement beneath a vehicle for receiving a material exuded by a vehicle system and identifying the vehicle system from which the material is exuded.

According to another aspect of the present invention a vehicle maintenance apparatus is provided that has a mat configured for placement beneath the vehicle where the mat has stenciled regions correlating to a vehicle system and a stenciled region defines an area for receiving and identifying the material exuded from the vehicle system.

According to another aspect of the present invention provides a mat having a stenciled region correlating to a vehicle system where the mat has stenciled regions that define an area for receiving a material exuded from a vehicle system, the vehicle is positioned over the mat and based on the position of the material exuded from the vehicle in relation to the stenciled region, the mat identifies the vehicle system from which the material was exuded.

According to another aspect of the present invention provides a mat having a deformable planar surface on which a vehicle wheel can be positioned, positioning a vehicle tire on the deformable planar surface imprints the tire tread into the deformable planar surface, positioning a vehicle tire on the deformable planar surface, removing the vehicle tire from the deformable planer surface, and determining tread depth from the imprint.

According to another aspect of the present invention provides a mat having a deformable planar surface on which a vehicle wheel can be positioned, positioning a vehicle tire on the deformable planar surface imprints the tire tread into the deformable planar surface, positioning a vehicle tire on the deformable planar surface, removing the vehicle tire from the deformable planer surface, and determining tire pressure from the imprint.

These together with other objects of the invention, along with the various features of novelty that characterize this invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and the objects set forth above will become apparent when consideration is given to the following detailed description hereof. Such description makes reference to the annexed drawings in which like numerals refer to like elements wherein.

DETAILED DESCRIPTION

Figure 1:
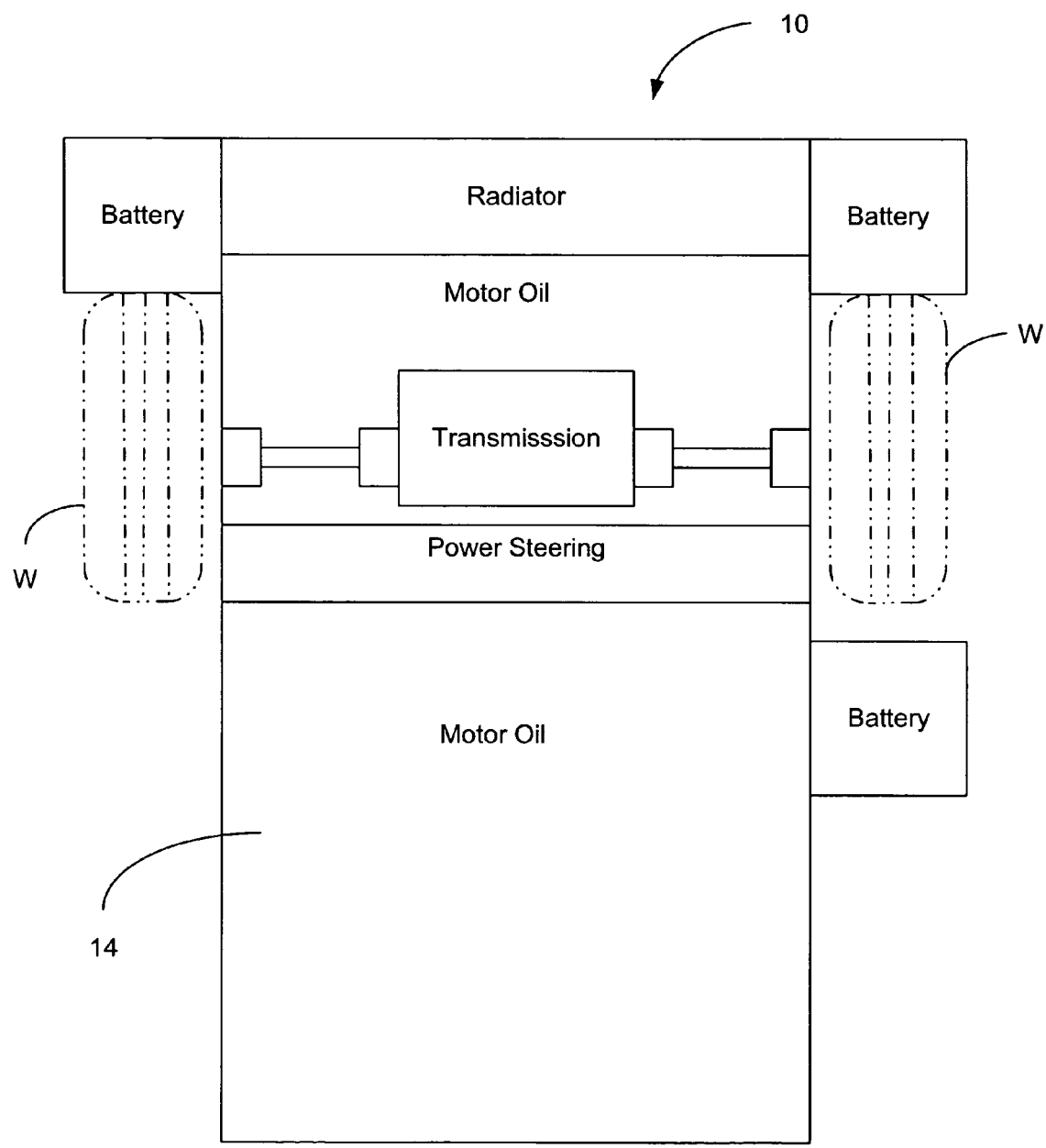
FIG. 1 is a top plan view of an apparatus according to one embodiment of the present invention.

With reference now to the drawings, and in particular to FIGS. 1 through 7 hereof, a new apparatus embodying the principles and concepts of the present invention and generally designated by the reference numeral 10 will be described.

As best illustrated in FIGS. 1 through 7, the apparatus 10 comprises two base members 12, a holding member 13, and a layer or layers of a mat 14 held in place by the base and holding members. The apparatus, in use, is meant to be placed upon the surface of a garage, driveway, etc., such as concrete, asphalt, soil, underneath the front end, rear end, engine, or entire vehicle in order to receive and identify fluids which leak from the vehicle. Staining and other damage to such surface is therefore prevented. Early identification of vehicle system fluid leaks will assist in preventative maintenance decisions and prevent vehicle problems from escalating into bigger problems due to late detection or lack of identification. In its simplest form apparatus 10 comprises a vehicle fluid receiving and identification mat having a layer or layers of a mat 14 stenciled with regions correlating to the location of a majority of the vehicle's systems. When the vehicle is at rest after operation the vehicle is parked over the mat 14 and the mat 14 collects or receives any fluid leaks from the vehicle. These fluid leaks are identified based on the vehicle system's fluid leas proximity to the vehicle system stenciled on mat 14. An operator, owner, mechanic, or other service personnel should monitor the vehicle and take appropriate maintenance, repair, or corrective action necessary to fix the vehicle problem and/or prevent further escalation of the vehicle problem.

As shown in FIG. 1, apparatus 10 is comprised of mat 14 preferably a planar, rectangular sheet of material, which will substantially traverse the width between the wheels W of the vehicle and the length of the engine but can be any desired size up to and including the width and length of the entire vehicle. The mat 14 can be composed of an absorbent, semi-absorbent or impervious material. In its simplest form mat 14 is comprised of a single layer of material such as closed cell foam, which is capable of being stenciled or marked as shown in FIG. 1 or as required by the specific configuration of the systems of the vehicle of interest. If the material chosen is light in weight and can be shifted from its current position by the air movement around the vehicle or the environment then an adhesive may be applied to mat 14 to secure it to the surface to prevent shifting or movement of the mat. Mat 14 can be comprised of any material that can be stenciled such as closed cell foam, foam rubber, rubber, plastic, fiber, fiber board, paper, pressed wood, cellulose or the like. In addition, mat 14 or its upper most layer can be white or light in color to assist with the identification of the various vehicle fluids or particulates collected on the mat. A more complex form of mat 14 is comprised of an impervious base layer with a layer or multiple layers or plies of a material that absorbs liquid or oil, which are stacked on the base layer. Further, the outermost layer may be made of a slip resistant, porous material to allow vehicle fluid drips to flow through to the layers below and to prevent slipping if driven or stepped on. For outdoor use where the mat 14 is subject to sunlight and the environment the outer layer may be made of a material that is resistant to the sun's ultraviolet rays. In addition, for outdoor use where mat 14 is subject to the elements a cover may be used to protect mat 14 from the elements when the vehicle is in use or not parked over the mat 14. Either form of mat 14 may be suitably sprayed, impregnated or otherwise treated with a flame-retardant material so as to minimize the possibility of fire. In addition, either form of mat 14 may be placed in a frame or other suitable holder made of a material such as polypropylene or vinyl of sufficient thickness to provide desired durability and to prevent shifting or movement of mat 14, if desired. Still further the base layer of mat 14 closest to the surface of the garage may have a nonskid coating or laminate to resist or minimize displacement.

Figure 2:
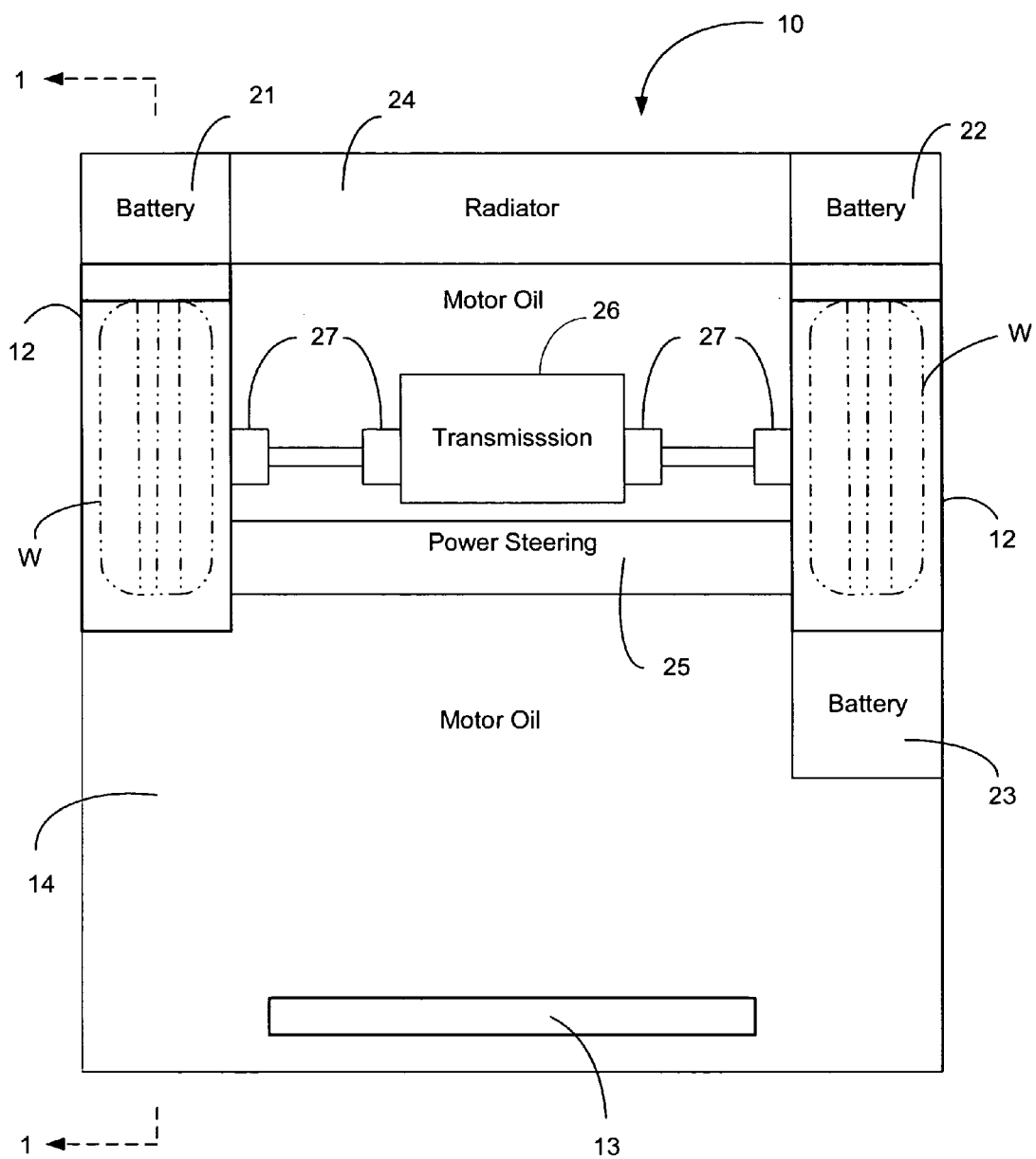
FIG. 2 is a top plan view of an apparatus according to one embodiment of the present invention.

As shown in FIG. 2 the mat 14 is configured for a typical front wheel drive vehicle. Battery 21, 22, 23 is stenciled in regions where a majority of the front wheel drive vehicle batteries are located, including left front corner of the vehicle, right front corner of the vehicle, or the region behind the right front wheel W well. Fluid drips from this system include water, acid, white corrosive film or other debris. Radiator 24 is stenciled in a region where a majority of the front wheel drive vehicle radiators systems are located, including front and centered between the front wheels W of the vehicle. Fluid drips from this system include water, antifreeze or coolant, which may be clear, yellow, blue, green or a combination thereof. Transmission 26 is stenciled in a region where a majority of the front wheel drive vehicle transmission systems are located, including centered between the front wheels W of the vehicle or offset from said position. Fluid drips from this system include transmission fluid, which may be clear, red or a combination thereof. The drive system is made up of constant velocity (CV) joint and boot 27, which are stenciled in a region where a majority of the front wheel drive systems are located, including for the left front wheel drive system starting with the left side of transmission 26 to the center of the left front wheel W by passing through a transmission side CV joint and boot 27 and a left front wheel W side CV joint and boot 27 and the right front wheel drive system starting with the right side of transmission 26 to the center of the right front wheel W by passing through a transmission side CV joint and boot 27 and a right front wheel W side CV joint and boot 27. Power steering 25 is stenciled in a region where a majority of the front wheel drive vehicle power steering systems are located, including centered between the front wheels W of the vehicle and behind radiator 24 or behind the transmission 26 as shown. Fluid drips from this system include power steering fluid, which may be clear, red or a combination thereof. The remaining area of mat 14 may catch vehicle fluid drips from the vehicle motor, brake lines, shock absorbers or other systems.

Figure 3:
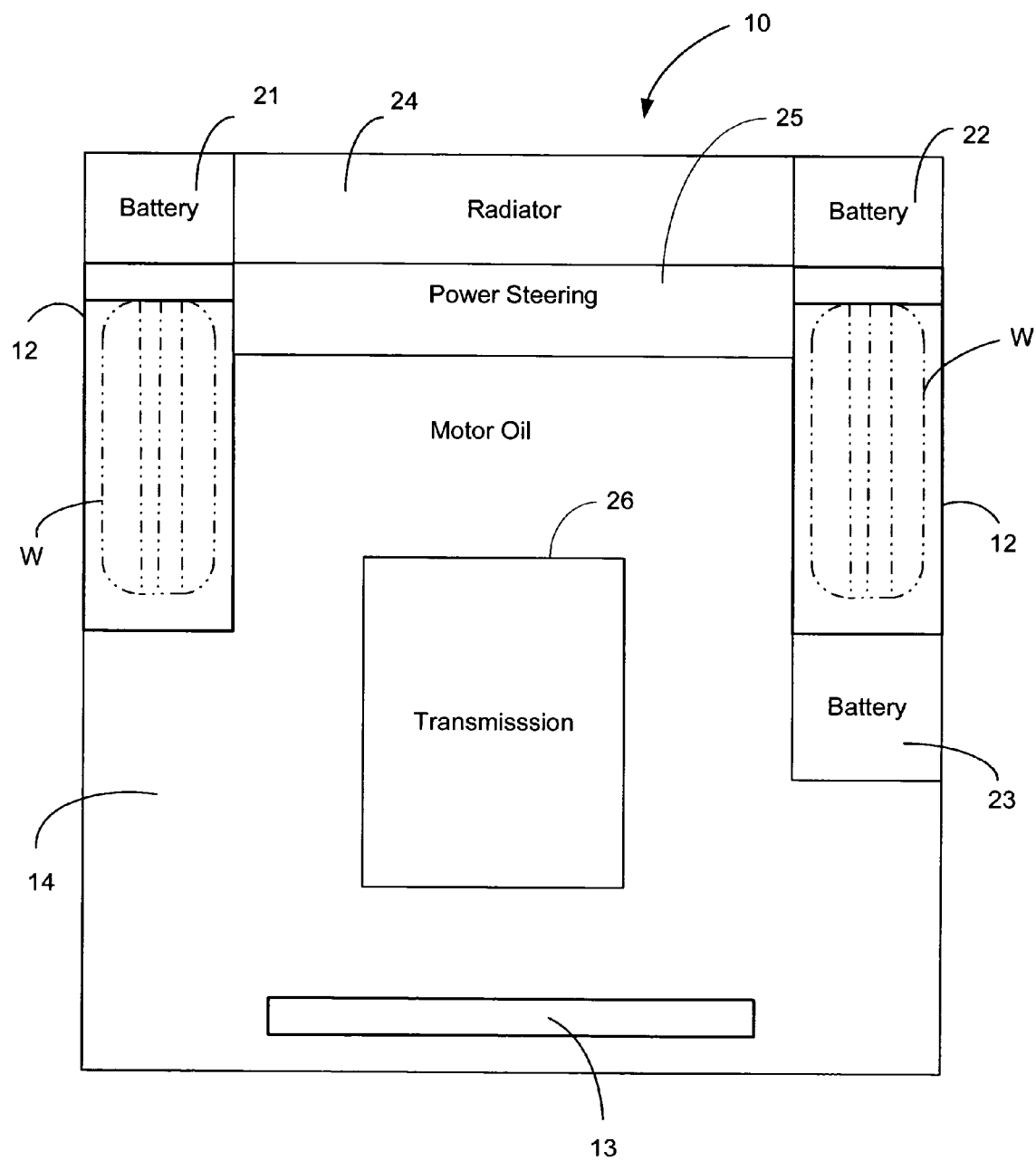
FIG. 3 is a top plan view of an apparatus according to one embodiment of the present invention.

As shown in FIG. 3, the mat 14 is configured for a typical rear wheel drive vehicle. Battery 21, 22, 23 is stenciled in regions where a majority of the rear wheel drive vehicle batteries are located, including left front corner of the vehicle, right front corner of the vehicle, and the region behind the right front wheel W well. Fluid drips from this system include water, acid, white corrosive film or other debris. Radiator 24 is stenciled in a region where a majority of the rear wheel drive vehicle radiators systems are located, including front and centered between the front wheels W of the vehicle. Fluid drips from this system include water, antifreeze and coolant, which may be clear, yellow, blue, green or a combination thereof. Power steering 25 is stenciled in a region where a majority of the rear wheel drive vehicle power steering systems are located, including front and centered between the front wheels W of the vehicle and behind radiator 24. Fluid drips from this system include power steering fluid, which may be clear or red or a combination thereof. Transmission 26 is stenciled in a region where a majority of the rear wheel drive vehicle transmission systems are located, including centered between the front wheels W of the vehicle or offset from said position. Fluid drips from this system include transmission fluid, which may be clear, red or a combination thereof. The remaining area of mat 14 may catch vehicle fluid drips from the vehicle motor, brake lines, shock absorbers or other systems.

The configuration of the stenciled regions on mat 14 may vary dependent on the vehicle and vehicle systems to be identified. In addition, base members 12 and holding member 13 comprise any material or form necessary to prevent mat 14 from shifting or being blown from its current position by the air movement around the vehicle or the environment. The color codes for fluids set forth herein may vary dependent on the vehicle and vehicle systems to be identified or the operator, owner, mechanic, or other service personnel choice for said fluid.

The mat 14 may consist of a single or multiple layers or plies material. In addition, mat 14 may be impregnated or coated with reactive agents that will assist with the identification of the various vehicle fluids or particulates collected on the mat 14. For example, when a fluid drips onto mat 14 the vehicle fluid may react with a chemical and turn said area of mat 14 a different color to indicate that a vehicle fluid drip occurred. A color-coded legend for identifying specific vehicle fluid drips may be stenciled on mat 14 to assist with identifying vehicle fluid drips.

Figure 4:
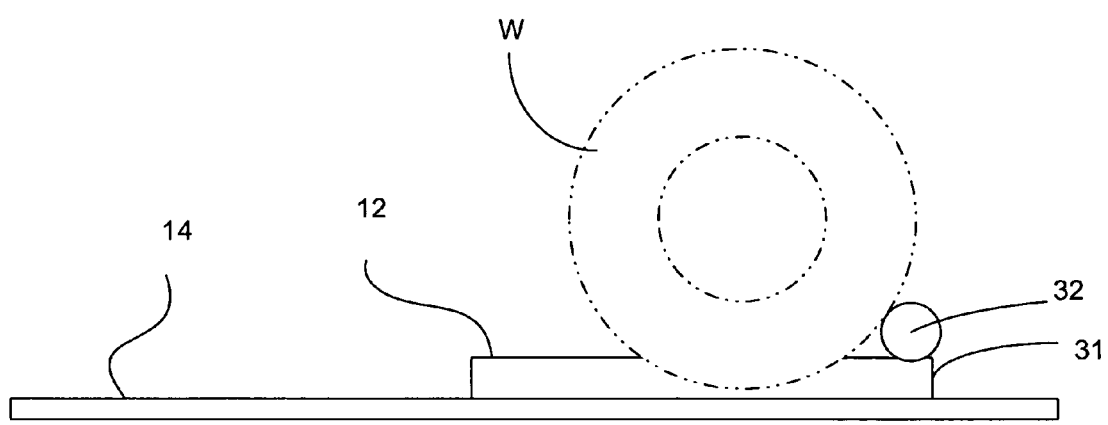
FIG. 4 is a cross-sectional view taken about lines 1—1 of FIG. 2.
Figure 5:
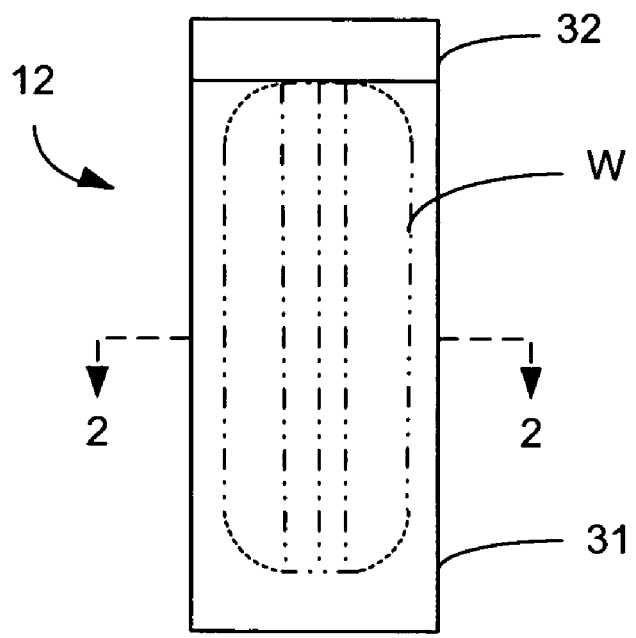
FIG. 5 is a top plan view of base member according to one embodiment of the present invention

As shown in FIGS. 4 and 5, the base member 12 is comprised of a planar surface 31 and a wheel bumper 32 that may be made of a material that is heavy enough to resist displacement of mat 14. The wheel bumper 32 aids the vehicle operator in stopping the vehicle in a predetermined position and returning the vehicle to substantially the same position over mat 14 between vehicle uses. The term wheel W shall include the tire and any other means for creating mobility of a vehicle.

Figure 6:
FIG. 6 is a cross-sectional view of base member taken about lines 2—2 of FIG. 5.

As shown in FIG. 6, the planar surface 31 is comprised of a deformable material that can indicate the tread depth of a tire of wheel W. Planar surface 31 provides the operator, owner, mechanic, or other service personnel with the condition of the tire tread of wheel W so said person can decide a) whether to rotate the wheels, b) whether a tire of wheel W is wearing non-uniformly (indicating that an alignment, suspension/shock-absorber or defective tire or wheel analysis should be pursued), c) the remaining life expectancy of a tire of wheel W and/or d) whether the tire of wheel W is properly inflated. The deformable material of planar surface 31 may be comprised of shape memory foam, rubber, styrofoam, paper, wood or the like. The type of deformable material may be selected based on the tread of the wheel W to be analyzed. Further, the deformable material of platform 31 may be color-coded or layered with different colors to assist in the identification of the condition of the tire tread of wheel W or whether the tire of wheel W is properly inflated. For example, planar surface 31 will be deformed by the tire tread of wheel W (when the vehicle is driven onto planar surface 31). An operator, owner, mechanic, or other service personnel can visually inspect the negative print of the tread of wheel W after the vehicle has been moved off the planar surface 31 and determine the tire tread condition based on the negative print of the tread of wheel W. In addition, the deformation of planar surface 31 gives the operator, owner, mechanic, or other service personnel a visual of whether the tire is inflated to the proper pressure. For example, if the negative tread print of wheel W is narrow and oblong then the tire of wheel W is likely over inflated. If the negative tread print of wheel W is oval or semi-circular then the tire of wheel W is likely under inflated.

Figure 7:
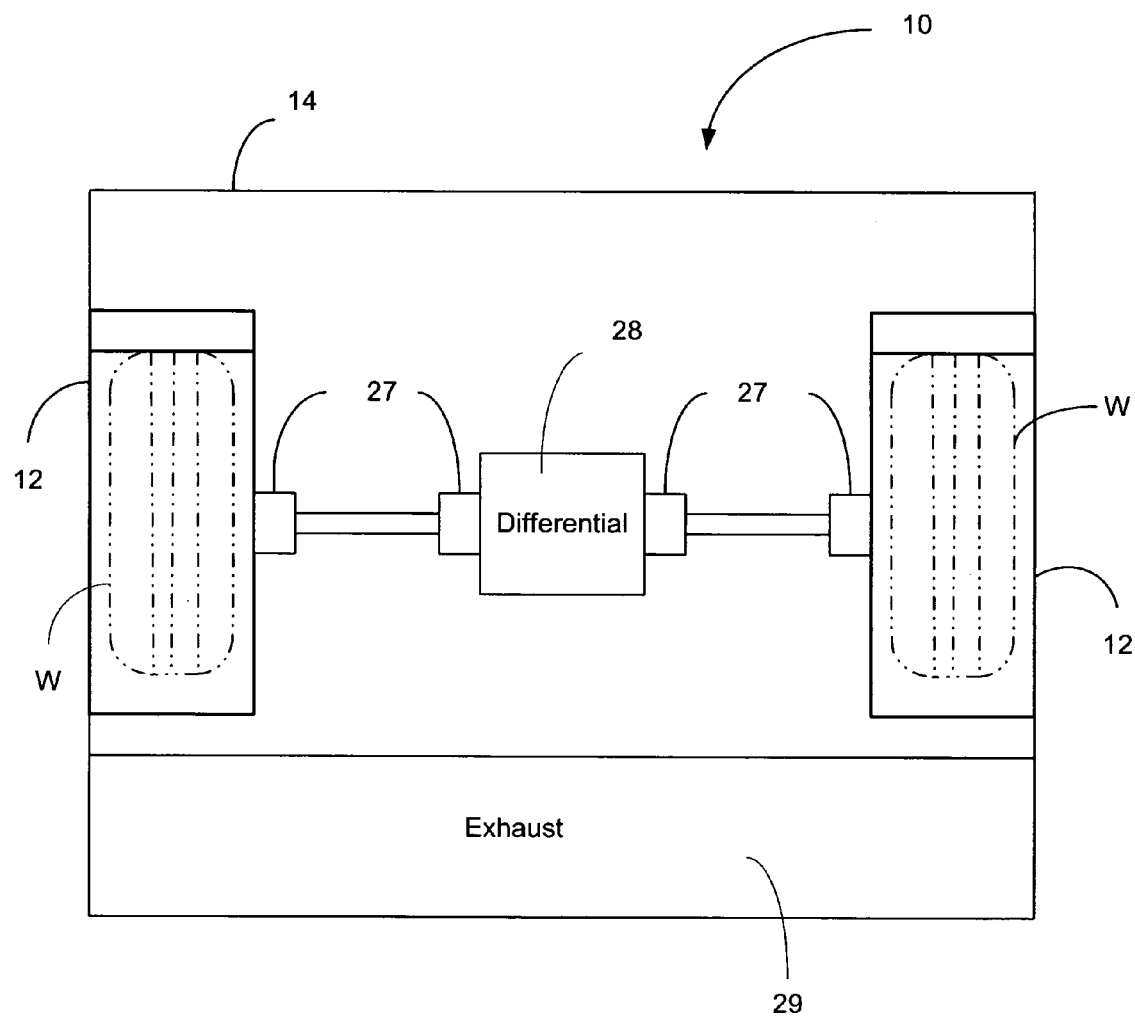
FIG. 7 is a top plan view of an apparatus according to one embodiment of the present invention.

As shown in FIG. 7, the mat 14 is configured for a typical rear wheel drive vehicle. The drive system of a rear wheel drive vehicle has a differential 28 centered between the rear wheels W and fluids from this system include differential oil, which may be auburn, brown, black or a combination thereof. Differential 28 is stenciled in a region where a majority of the rear wheel drive vehicle differential systems are located, including centered between the rear wheels W of the vehicle. Fluid drips from this system include differential fluid, which may be green, gray or black or a combination thereof. The rear wheel drive system may be made up of constant velocity (CV) joint and boot 27, which are stenciled in a region where a majority of the rear wheel drive systems are located, including for the left rear wheel drive system starting with the left side of differential 28 to the center of the left rear wheel W by passing through a differential side CV joint and boot 27 and a left rear wheel W side CV joint and boot 27 and the right rear wheel drive system starting with the right side of differential 28 to the center of the right rear wheel W by passing through a differential side CV joint and boot 27 and a right rear wheel W side CV joint and boot 27. Exhaust 29 is stenciled in a region where a majority of the vehicle exhaust systems are located, including anywhere between the rear wheels W of the vehicle or the rear end of the vehicle. Foreign particulates or excessive emissions from this system include oil, antifreeze/coolant and excessive emissions. A tube with a ninety-degree bend may be fastened to the vehicle's exhaust system to deflect the emissions onto the exhaust 29 region of mat 14. The remaining area of mat 14 may catch vehicle fluid drips from the vehicle drive system, brake lines, shock absorbers or other systems.

As shown in FIGS. 2, 3 and/or 7, or in combination, the mat 14 can be configured for a two-wheel drive, rear wheel drive, and four-wheel drive, semi tractor-trailer rigs, construction, agriculture, lawn and garden, and recreational equipment.

In use, apparatus 10 is disposed beneath a vehicle or other motorized machine to catch or receive fluid drips, identify tire tread depth, tire pressure or particulate emanating from the vehicle in the designated regions. An operator, owner, mechanic, or other service personnel should monitor the vehicle for material received and identified and take appropriate maintenance, repair, or corrective action necessary to fix the problem or to prevent further escalation of the problem identified. The operator, owner, mechanic, or other service personnel may schedule routine visual inspections of apparatus 10 when the vehicle has been moved off of the apparatus 10 or by sliding the apparatus out from under the vehicle. In addition, the operator, owner, mechanic, or other service personnel can identify fluid drips, wheel tread depth, wheel inflation, particulate emanating from the vehicle or track the progress of fluid drips, tire tread depth or particulate emanating from the vehicle based on the fluid drips or particulate identified in the stenciled region of mat 14, the color of said fluid drips or particulate, the proper tire inflation or tread depth identified.

With respect to the above description then, it is to be realized that the optimum dimensional relationships for the parts of the invention, to include variations in size, materials, shape, form, function and manner of operation, assembly and use, and it is evident that many alternatives, modifications, and variations will be apparent and obvious to those skilled in the art in light of the foregoing description, those as well as all equivalent relationships to those illustrated in the drawings and described in the specification are intended to be encompassed by the present invention. Accordingly, it is intended to embrace all such alternatives, modifications and variations as fall within the spirit and broad scope of the appended claims.

I claim:

1. A vehicle maintenance apparatus, comprising:
    a mat;
    said mat configured for placement beneath a vehicle; and
    means associated with said mat for receiving a material exuded by a vehicle system and identifying the vehicle system from which said material is exuded.

2. An apparatus as recited in claim 1, wherein said means comprises:
    a stenciled region on said mat correlating to a vehicle system;
    wherein said stenciled region defines an area for receiving and identifying a material exuded from said vehicle system.

3. An apparatus as recited in claim 1, wherein said material is selected from the group consisting essentially of fluids, drips, particulates and emissions from a vehicle system.

4. An apparatus as recited in claim 2, wherein said material is identifiable based on proximity of said material to said stenciled region for receiving and identifying a material.

5. An apparatus as recited in claim 4, wherein said material is further identifiable by color.

6. An apparatus as recited in claim 1, wherein said mat comprises a fluid-impervious material.

7. An apparatus as recited in claim 1, wherein said mat comprises a fluid-absorbent material.

8. An apparatus as recited in claim 1, further comprising means for guiding said vehicle to a predetermined position over said mat.

9. An apparatus as recited in claim 8, wherein said guiding means comprises a wheel bumper.

10. An apparatus as recited in claim 1, further comprising means for protecting said mat from harmful elements.

11. An apparatus as recited in claim 10, wherein said protecting means comprises a cover or other outermost layer.

12. An apparatus as recited in claim 1, wherein said mat is impregnated or coated with a reactive agent to assist in the identification of said material.

13. An apparatus as recited in claim 1, wherein said mat has a deformable planar surface on which a vehicle wheel can be positioned.

14. An apparatus as recited in claim 13, wherein said deformable planar surface is configured for identifying tire tread depth.

15. An apparatus as recited in claim 14, wherein positioning a vehicle tire on said deformable planar surface imprints said tire tread into said deformable planar surface.

16. A vehicle maintenance apparatus, comprising:
   a mat;
   said mat configured for placement beneath a vehicle;
   said mat having a stenciled region correlating to a vehicle system;
   wherein said stenciled region defines an area for receiving and identifying a material exuded from said vehicle system.

17. An apparatus as recited in claim 16, wherein said material is selected from the group consisting essentially of fluids, drips, particulates and emissions from a vehicle system.

18. An apparatus as recited in claim 16, wherein said material is identifiable based on proximity of said material to said stenciled region for receiving and identifying a material.

19. An apparatus as recited in claim 18, wherein said material is further identifiable by color.

20. An apparatus as recited in claim 16, wherein said mat comprises a fluid-impervious material.

21. An apparatus as recited in claim 16, wherein said mat comprises a fluid-absorbent material.

22. An apparatus as recited in claim 16, further comprising means for guiding said vehicle to a predetermined position over said mat.

23. An apparatus as recited in claim 22, wherein said guiding means comprises a wheel bumper.

24. An apparatus as recited in claim 16, further comprising means for protecting said mat from harmful elements.

25. An apparatus as recited in claim 24, wherein said protecting means comprises a cover or other outermost layer.

26. An apparatus as recited in claim 16, wherein said mat is impregnated or coated with a reactive agent to assist in the identification of said material.

27. An apparatus as recited in claim 16, wherein said mat has a deformable planar surface on which a vehicle wheel can be positioned.

28. An apparatus as recited in claim 27, wherein said deformable planar surface is configured for identifying tire tread depth.

29. An apparatus as recited in claim 28, wherein positioning a vehicle tire on said deformable planar surface imprints said tire tread into said deformable planar surface.

30. A method for identifying a problem with a vehicle system, comprising:
   providing a mat;
   said mat having a stenciled region correlating to a vehicle system;
   wherein said stenciled region defines an area for receiving a material exuded from said vehicle system;
   positioning a vehicle over said mat; and
   based on position of a material exuded from said vehicle in relation to said stenciled region, identifying the vehicle system from which said material was exuded.

31. A method as recited in claim 30, wherein said material is selected from the group consisting essentially of fluids, drips, particulates and emissions from a vehicle system.

32. A method as recited in claim 30, further comprising identifying said material based on color of said material.

33. A method as recited in claim 32, wherein said mat is impregnated or coated with a reactive agent to assist in the identification of said material based on color.

* * * * *